(12) United States Patent
Mandzsu, Sen. et al.

(10) Patent No.: US 6,444,080 B1
(45) Date of Patent: Sep. 3, 2002

(54) PROCESS OF ROUGHENING THERMOPLASTIC FILMS AND ROUGHED PLASTIC FILMS

(76) Inventors: József Mandzsu, Sen., Rádvany u.19, Budapest, H-1118 (HU); József Mandzsu, Jr., Bod P'eter Lejt"o 4, Budapest, H-1112 (HU); Zoltán Mandzsu, Bod P'eter Lejt"o 4, Budapest, H-1112 (HU)

( * ) Notice: Subject to any disclaimer, the term of this patent is extended or adjusted under 35 U.S.C. 154(b) by 0 days.

(21) Appl. No.: 09/367,006

(22) PCT Filed: Jan. 27, 1998

(86) PCT No.: PCT/HU98/00010

§ 371 (c)(1),
(2), (4) Date: Aug. 4, 1999

(87) PCT Pub. No.: WO98/34775
PCT Pub. Date: Aug. 13, 1998

(30) Foreign Application Priority Data

Feb. 5, 1997 (HU) .............................................. 9700352
Jun. 19, 1997 (HU) .............................................. 9701070

(51) Int. Cl.⁷ ........................... B32B 31/04; B29C 59/02
(52) U.S. Cl. ........................ 156/276; 156/93; 156/290; 156/306.3; 414/922
(58) Field of Search .............................. 156/91, 92, 93, 156/219, 247, 290, 306.3, 306.6, 276; 414/922

(56) References Cited

U.S. PATENT DOCUMENTS

| | | | |
|---|---|---|---|
| 2,057,548 A | | 10/1936 | Wallach et al. |
| 2,784,131 A | * | 3/1957 | Fletcher, Jr. |
| 3,869,309 A | * | 3/1975 | Fonne et al. |
| 4,085,851 A | * | 4/1978 | Young |
| 4,421,805 A | * | 12/1983 | Prader |
| 4,488,918 A | * | 12/1984 | Jofs |
| 5,993,936 A | * | 11/1999 | Gardner |

FOREIGN PATENT DOCUMENTS

| | | | |
|---|---|---|---|
| DE | 1 917 566 | * | 12/1970 |
| DE | 17 04 920 A | | 6/1971 |
| DE | 1 729 117 | * | 6/1971 |
| DE | 1 779 373 | * | 10/1971 |
| DE | 2 313 870 | * | 7/1982 |
| DE | 34 37 414 A | | 4/1986 |
| DE | 42 07 210 A1 | | 9/1993 |
| EP | 0 089 680 | | 9/1983 |
| EP | 0 863 087 | * | 9/1998 |
| FR | 1 217 242 | | 5/1960 |
| FR | 1 334 401 A | | 12/1963 |
| FR | 2 353 207 | * | 1/1978 |
| GB | 2 165 203 A | | 4/1986 |
| NL | 8 800 414 A | | 9/1989 |
| WO | 80/00936 | * | 5/1980 |

* cited by examiner

Primary Examiner—Curtis Mayes
(74) Attorney, Agent, or Firm—Duane Morris LLP

(57) ABSTRACT

The invention relates to process for roughening thermoplastic films and roughed films. The invention further relates to process for preventing thermoplastic packaging films from slipping on each other and a suitable system for such purpose. The essence of the roughening process is that practicles consisting of the same polymer as that of the film and/or other plastic material being able to weld together with that, and having suitable size and/or abrasion resistance are brought to the surface to be roughened of semi-finished product having sufficient reserved heat content to maintain condition appropriate for welding said particles on said thermoplastic film surface to be roughened or on one or on both film surfaces being re-heated to such temperature and are dispersed in suitable closeness and configuration and that condition of the roughened surface is maintained until desired welding process is completed. Process for preventing thermoplastic packaging films from slipping on each other characterised in that a system comprising films to be stacked—at least one of which is roughed—and has protrusions of suitable closeness on its surface; a binding element having a loose fibrous structure and stability is placed on the film or on its specified parts, on the entire surface or on surface pan(s); said binding element comprises fiber of such closeness and layer thickness that between the fiber of the binding element and the protrusions of the roughed film a mechanical joint is formed.

12 Claims, No Drawings

PROCESS OF ROUGHENING THERMOPLASTIC FILMS AND ROUGHED PLASTIC FILMS

TECHNICAL FIELD

The invention relates to process of roughening thermoplastic films. In the present context the term of "film" also includes plastic products of different thicknesses such as plates, sheets, pellicles, which may optionally be supplied with a base or may be covering layers as well.

The invention further relates to a system for decreasing the slip of films. The technical term "films" also means plate-like products of different thickness varying from entirely thin to markedly thick.

BACKGROUND ART

It is known that the process for production of thermoplastic films starting from the appropriate mixtures or granules is made so that the unprocessed material is melted or moulded by heating and the desired product is formed in a tool by die-casting or pressing the material through the gap of an extruding die.

The gap does not necessarily determine a flat film, for example in case of hose-like products it can be round shaped as well.

In order to gain its final shape and for the purpose of its stabilisation at leaving the gap of the tool or being taken out of the mould the moulded product is congealed by cooling. Most often the cooling is made by blowing cold air on. After cooling undesired deformation does not occur any more, so cutting to size, winding etc. can take place.

The quality of films' surfaces is depending mostly on the surface of the tool; in general that is completely plain.

Similarly to the manners as stated above thermoplastic films can be moulded by heat transmission again and may be subjected to further processing.

In connection with the products prepared from plastic films it often creates difficulties that film products, for example folders put on top of each other, are slipping on each other, which can cause falling out of documents, thus the pieces of paper can get dirty and damaged or spoiled. In the same way, in case of plastic sacks instead of the earlier conventional sacks made of textile put on top of each other, when setting up upper sacks, in case of the smallest displacement of the centre of gravity plain surfaces lying on each other can slip on each other to say nothing of shake which takes place in the course of shipment and interplant transport.

Until now slipping of plastic sacks has been tried to prevent in different ways. The most obvious procedure seemed to be to coat sack surfaces lying on each other with adhesive. This solution has raised the problem of choosing the adhesive and the quality of the adhesive. Mostly, when adhesive of an excellent quality was used, it was difficult to pull the sacks apart without the consequence of damaging (deterioration) of the plastic film, while using an adhesive of poor quality due to the insufficient adhesion strength, the task could not be deemed to be solved either.

As an other type of solution it was tried to create antislip surfaces by forming unevenness from the material of the film. According to a typical solution of that kind disclosed in DE 3437414, the film was embossed from the direction of the internal side of the sacks so that bumps were formed on the external side of the sacks. That way the slipping between a film surface with bumps and any other surface not having any bumps is not decreased at all and the slipping between two surfaces having bumps of that kind is somewhat decreased by the contact between the compatible bumps belonging to the opposite surfaces. Those protrusions, however, are not solid and they are, being pressed normally by the opposite film surface, typically plainly lying and archly rounded. Thus the slip decreasing effect is not satisfactory. According to an other solution based on a similar principle grooves were formed in the die casting machine before the gap which created ribs on the films' surface in the direction of the material's movement. By this means the problem was solved in part only because the slipping could only be prevented perpendicularly to the line of the aforementioned ribs, the product was able to slip freely in the other direction. Antislip surface on extruded film sheets was tried to create also by forming tips and cavities between the tips on the cylinders forwarding the film by which formations rising from the surface were created. Although these formations were theoretically suitable to prevent slipping in any directions, the required effect it could neither provide.

According to an other solution also known from the prior art unprocessed plastic granules were mixed with extraneous substance which could not be incorporated homogeneously into the basic plastic and humps were formed. However in the course of that kind of method the extruder and the connected passing cylinders were exposed to abrasion, so the tool was getting deteriorated early and besides it was impossible to keep control over the disposal of humps as it would have been required.

A procedure was also applied, where humps were formed on both sides of the film by mixing the raw material with some chemical additive. The drawback of that procedure is its high cost, because the additive, having a high price, was demanded in quite large quantities, and also that both sides of the product were provided with humps, which limited the scope of utilisation.

All of the aforementioned procedures are costly, uneconomical and are not as efficient as it would be required. These methods are used because until now there have been no adequate processes which would solve the problem favourably. A further disadvantage of all these solutions is that humps and formations rising from the surface are covered by the material of the film itself and, although they are subjected to greater abrasion effect, their resistance to abrasion is equal to that of the other parts of the film.

The common disadvantage of the solutions described above is that, due to its extenuation or its having extraneous substance particles implied in its structure, the tensile strength of the product is reduced.

From DE 42 07 210 a process has been known according to which the surface of a thermoplastic plate complement prepared with injection moulding (endproduct) is warmed or partially softened in order to form a molten layer for embedding particles into the same. The plastic surface should be warmed, preferably two times and/or pressing rolls are applied to ensure a safe adhesion/fixing. The specification teaches to provide a deep embedding of the particles into the surface. The material of the said particles may be very different, their geometric features are not critical. Applying that method to any plastic plate components which contain any orientation (coming, for example, from the previous manufacturing process of film blowing) is impossible, because re-heating the plastic component leads to its undesired shrinkage and deformation due to the release of the orientation stress. Thus the application of this method is severely limited. There are solutions known from the prior art dealing with decreasing the slipping of plastic films on each other applying external guiding means or binding elements. GB 2 165 203 discloses a system for preventing teabags from slipping on each other with rigid guiding means perpendicular to the direction of the slipping of the sacks, not being in contact with the contacting/slipping film surface portions. FR 1 334 401 discloses a system in which the outer surfaces of plastic sacks are laminated with rough fabric comprising hard knots decreasing the slipping between these laminated-with-fabric surfaces with the hooking of these textile knots and yarn pieces into each other. That only decreases slip between two surfaces both laminated with rough fabric utilising the co-operation of the two fabric surfaces, actually simulating the slip properties of the earlier conventional jute sacks. The slip between the film surface laminated with the above fabric and another known to the prior art plastic film surface not laminated with the above fabric is therefore not at all decreased, no teaching can be learnt about decreasing the slip in that kind of a contact in the prior art.

DISCLOSURE OF INVENTION

The object of the invention is to provide a process of forming suitable antislip films for further use which eliminates the deficiency and drawbacks of the methods known from the state of the prior art without modifications in well known technologies and tools.

The invention is based on the recognition that if particles consisting of the substance of the film and/or other plastic material being able to weld together with that, and having suitable size are brought to the melted film, then the temperature of the particles at their sides looking on the film surface will increase and also themselves will be melted at least partly and will be strongly welded together with the film. Standing out of the surface at least partly, these particles make the surface rough.

According to the present invention the surface of the moulded film, as a semi-finished article, just leaving the gap of the extruder die during the manufacturing process can be roughened.

The substantial quality of the particles used for the creation of roughed surfaces should be selected so that their abrasion resistance and similarly the particle size are suitable for this purpose. If desired, a homogeneous fraction of particles such as particles representing a fraction separated by passing through sieves, are applied to the surface.

The particles may be applied in well ordered or disordered configuration to the entire surface or to specified surface areas such as edges or, if demanded, in spots, repeating the application once or several times depending on the desired pattern. For example the pattern may be formed by using templates or otherwise.

The process according to the present invention is extremely economical, because no special chemical additives and no change of the tool for preparation of the film are needed and similarly, the particular conditions and parameters of the manufacturing procedure are remaining the same. Quite often it is sufficient to rough one side of the product only, however, in accordance with the present invention optionally film made rough either both sides or only one side may be prepared as well.

Thus the essence of the present invention is that particles consisting of the substance of the film and/or other plastic material being able to Weld together with that, and having suitable size and/or demanded abrasion resistance are brought to the surface to be roughened of semi-finished product having sufficient reserved heat content from its manufacturing process to maintain condition appropriate for welding of the thermoplastic film surface to be roughened and the particles are dispersed in suitable closeness and configuration and that condition of the roughened surface is maintained until desired welding process is completed.

The roughed films—at least on one side of them on the entire surface or on specified areas of the surface—comprise protrusions consisting of particles having substance of the film and/or other plastic material being able to weld together with the substance of the film, which are welded into the surface and at least partly standing out of the surface.

The invention further relates to a system for decreasing the slip of films. It is based on the recognition that the connection between a roughed surface and an other, in a given case roughed film surface can be made even more firm if a particular binding element is placed between them.

BEST MODE FOR CARRYING OUT THE INVENTION

The essence of the invention is system for decreasing the slipperiness of thermoplastic packaging films, comprising first and second film surface portions, which first film surface portion is roughened with protrusions in its surface, and comprising a binding element of a fibrous structure, which binding element is positioned at least partly on the second film surface portion and is fixed at least partly to the second film surface portion against slipping along the surface, characterised in that the height of at least a part of the said protrusions in the roughened film surface is greater than the half of the thinnest fibre-thickness of the binding element, and the fibrous structure of the binding element is loose to such an extent which makes the penetration of at least some of the said protrusions into the fibrous structure possible by that there is free room between the fibre portions of the binding element for at least portions of the protrusions, and the said binding element positioned at least partly on the second film surface portion is partly or fully positioned on at least such part or parts of the second film surface portion which, with the mediation of the binding element, are connected to or can, in the course of application, be connected to the roughened surface of the first film surface portion or to the roughened surface of another film surface portion having surface roughening of the same said quality as that of the first film surface portion.

According to one preferable aspect of the present invention roughed film sheets are used on both surfaces of the binding element.

According to a further preferable aspect of the present invention the binding element is fixed to one of the two film sheets (to that one which is not roughed); by sticking, welding or sewing.

It is also preferable if the thickness of the binding element reaches at most up to or more preferably is less than the greatest value of the projection of the particles in the surfaces.

Suitably a binding element based on plastic, having well ordered or disordered fibrous structure, such as non-woven fabric, forming veily film and having reticular structure, prepared by thermo-fleece technology is used.

When in practical use, 'roughed plastic film-binding element-roughed plastic film' tripartite system is built, the resulted three-member joint will be strong enough to withstand also greater mechanical stress without slipping. At the same time the joint can be broken off simply, because though in the direction of the slipping on each other the layers are stabilised, in case of necessity elements can easily be lifted off each other.

For the mechanical joint of the surfaces it is needed that there are bigger protrusions of lower density or smaller protrusions being closer to each other in the surface, so a certain part of the surface needs to comprise protrusions. The relation between size and closeness of protrusions is determined by several factors such as the thickness of the film and its resistance to mechanical stress or that can be decided depending on the field of application.

Geometric shape of particles is important because in case of plainly lying, lenticular, archedly rounded particles, where for example the welding line is long, the fibres being between the particles obviously can not keep on holding them as it would be desired, they slide off, they do not get stuck in cavities between them. According to the invention it is preferable if at least one of the first and the second film surface portions comprises polyethylene, preferably at least on of the first and the second film surface portions may comprise polypropylene; further at least one of the first and the second film surface portions may comprise woven polypropylene film. The surface protrusions forming the roughness may be solid. The surface protrusions forming the roughness may be solid particles fixed to the film surface without resilient stems. The surface protrusions forming the roughness may be grains fixed to the film surface. The substance of the protrusions may be plastic, in a preferred case identical with the substance of the film. The protrusions may be fixed to the film surface with adhesion or by welding. At least a part of the protrusions in the film surface may have tangential planes perpendicular to the film surface. The section in the plane of the film surface of at least a part of the protrusions may not cover the shape of projection of the protrusions viewed perpendicularly to said film plane. The size of the protrusions may be smaller than 500 microns, more preferably smaller than 250 microns. The closeness of the protrusions in the film surface may be at least 30 protrusions per square centimetre, more preferably at least 50 protrusions per square centimetre, or at least 100 protrusions per square centimetre. The distance of at least a part of the surface protrusions from the neighbouring protrusions being in the same film surface may not be less than the thinnest fibre-thickness of the binding element. The distance of at least a part of the surface protrusions from the neighbouring protrusions being in the same film surface may not be less than the sum of the thinnest fibre-thickness of the binding element and the greatest size of the said protrusions.

As it was mentioned above, the binding element has a fibrous structure and, in addition, fibres must have suitable individual stability to prevent the particles from tearing it apart and the fibres from slipping off it when stress in the direction of slipping arises. In addition the structure of the binding element must be loose enough to let the protrusions penetrate into the fibrous structure. As binding element may be used a fabric with disordered structure, fleece, felt, etc., where fibres are bound together by using known procedures such as adhesive way, sewing, spot-welding etc. According to a preferred embodiment of the invention the binding element comprises plastic, the binding element may be based on polyproylene, or for example polyethylene or polyester or polyamide. The binding element may be a non-woven fabric. The binding element can be thermally bonded non-woven fabric or can be bonded mechanically, with needles or water jet. The binding element preferably does not contain colouring masterbatches. The average specific mass of the binding element is preferably not greater than 40 grams per square metre, more preferably not greater than 17 grams per square metre, most preferably not greater than 10 grams per square metre. The thickness of the binding element generally may be less than the height of the highest protrusion of the film surface. Both surfaces of the binding element facing film surfaces may be of the same quality. The fixing against slipping along the surface between the binding element and the second film surface portion may be fully or partly ensured by that at least a portion of the surface part of the second film surface portion covered with the binding element has a surface roughening of the said quality. The fixing against slipping along the surface between the binding element and the second film surface portion may be fully or partly ensured by that at least a portion of the surface part of the second film surface portion covered with the binding element is adhered to the binding element. The fixing against slipping along the surface between the binding element and the second film surface portion may be fully or partly ensured by that at least a portion of the surface part of the second film surface portion covered with the binding element is welded to the binding element. The fixing against slipping along the surface between the binding element and the second film surface portion may be fully or partly ensured by that at least a portion of the surface part of the second film surface portion covered with the binding element is sewn to the binding element. The two planar sets of geometric points defined by the perpendicular to the film plane planar views of the protrusions of at least certain parts of the first and second film surface portions may be able to be laid in a common plane in such a way that the two planar sets of points are not even partly covering each other. The second film surface portion may be with the mediation of the binding element, in said connection with the roughened surface of the first film surface portion or with the roughened surface of another film surface portion having surface roughening of the same said quality as that of the first film surface portion. The second film surface portion may not be in said connection but may be able to get, in the course of application, with the mediation of the binding element, to said connection with the roughened surface of the first film surface portion or with the roughened surface of another film surface portion having surface roughening of the same said quality as that of the first film surface portion. The second film surface portion may be, with the mediation of the binding element, in said connection or may be able to get, in the course of application, to said connection with the roughened surface of the first film surface portion. The first and second film surface portions may be parts of separate pieces of packaging means or separate packing containers. The second film surface portion may be, with the mediation of the binding element, in said connection or may be able to get, in the course of application, to said connection with the roughened surface of a film surface portion other than the first film surface portion, having surface roughening of the same said quality as that of the first film surface portion. The first and second film surface portions may be parts of the same piece of packaging means or the same packing container. The said piece of packaging means may be selected of the group of a sheet, a tube, a sack preform, a sack or bag and a box which may be based on polyethylene, polypropylene, polypropylene woven film. The said packing container and further packing container(s) of a structure identical with that of the said packing container may be in contact with each other in such a way that film surface of a packing container covered with binding element is in connection with roughened film surface of other packing container(s). The said packing containers of identical structure may be in overlapping bonds with each other forming elements of a regular stack.

Films made suitable for the purpose of packaging are usually wound and stored in rolls, at the utilisation they are cut to size and the packaging is carried out.

The place where the binding element will get into is already determined at the roughening process of the film, accordingly at production of the film, when smooth film, which, from the invention point of view, is described as a semi-finished product, is in the appointed places of its surface made rough with taking the desired position of the binding element into account but it is also possible to provide the smooth finished film with roughness in the places where necessary. Films may contain a self adhesive layer on their surface, if required, too.

INDUSTRIAL APPLICABILITY

More particularly, the process for roughening films according to the present invention is illustrated by the following examples relating to manufacturing of plastic sacks. The new system provides a good protection against the slipping of the surfaces in case of a static contact. The system also has two further, new advantages over presently known solutions. One advantage is, that the bond between the binding element and the roughened film, however it prevents slipping along the surface, can easily be opened in the direction normal to the surface without any extra effort, not causing any damage to either of the surfaces. The surfaces can be lifted off each other and replaced onto each other many times, if necessary, which (for example at manual re-stacking of packing sacks) is a great advantage over the earlier conventional process, using an adhesive bond between packages lying upon each other. This beneficial property is a result of the fact that the protrusions of the roughened film surface do not have resilient stems, like the ones the hooking components of hook and loop fasteners have, and hence not any such strong normal-direction bond can be created between the two components as in the case of hook and loop fasteners. Another advantage of the new system over common film surfaces is that it significantly prevents the two surfaces lying upon each other from slipping up on each other even if the surfaces are being shaken. The system has this property because the protrusions of the film surface lying horizontally are placed among the fibres of the binding element lying on it, penetrating the fibrous structure, thus the horizontal shear strength of the bond is not ensured by a conventional static frictional force but by a kind of hooking. Hence the horizontal shear strength of the new system is fairly significant already at very little normal surface pressure, while the static friction between conventional surfaces decreases proportionally with the pressure. During truck delivery of plastic sacks stacked upon each other, due to vibration, the pressure pressing the surfaces to each other can repeatedly drop even near to zero, which, in case of ordinary sacks, results in slipping of the sacks, while in case of the new system it has no harmful effect at all.

EXAMPLES

Example 1

Tubular film used as starting material for manufacturing plastic sacks is processed by moulding and extrusion of the polyethylene raw material so that the temperature of the film's substance just leaving the round shaped gap of the tool is 195° C. The tubular film—as it is usual in blown hose extrusion processes—is drawn up to the cooling tower and in the usual way to form a balloon air is blown inside of the hose enclosed by the tool and a pair of lifting nip-rolls. By setting the parameters such as air volume entrapped in the balloon, the speed of rotation of the screw of the extrusion machine and the pull off speed, finished film of 0.150 mm thickness and 700 mm width is prepared. According to the present invention particles consisting of the film's substance are brought to the surface with air flow concentrically or in separate segments separately together before blowing the cooling air on. The film is cooled by the cooling air to the point of congelation, so after that no changes of sizes can occur. After the extrusion the finished film tube is further processed in accordance with the technology suitable for sack manufacturing.

The present invention is further illustrated by an antislip system as follows:

Example 2

Plastic granules are usually packaged in plastic sacks of 25 kg of weight and these sacks are transported on pallets put on top of each other in stacks in quantities of more than 1000 kgs each. To prevent such sacks from slipping up on each other, sacks are prepared from roughed films. The sacks are prepared from gusseted tube on a packaging machine. To prevent slipping both sides of the film tube, except the part which is gusseted, are made rough so that at least 50 protrusions pro square centimetre should be in the roughed parts of the surface. Thus the filled sacks lie on each other with their roughed parts of surfaces. Fleece bands of 10 cm of width and 30 cm of length are used as binding elements. When the packaging machine finished filling up a sack, that is forwarded on a conveyer to the stacking machine. A piece of fleece band is placed on each sack lying on the moving conveyer before reaching the stacking machine so that it is placed lengthwise in the middle of the sack. The sacks are put on each other by the stacking machine so that each sack, in a part of their common contact surface, contacts the adjoining sacks being one line above with the mediation of the binding element. The fibres of the binding element are clinging to the upper and lower sacks and fasten them to each other with a mechanical joint and prevent them from slipping on each other.

Example 3

The film, which is the substance of plastic sacks recently applied for packing corn or animal feed instead of the earlier conventional sacks made of textile, is made of strips of polypropylene film, actually with the earlier conventional method i.e. weaving. The 540 mm wide tube, made of the woven film, already printed on one side is, during rewinding, roughened on both sides of the tube in two continuous, 50 mm wide stripes being displaced from each other by 160 mm's in such a way, that polypropylene grains of 100 to 200 micron size are firmly fixed by adhesion to the surface of the film in a closeness of about 30 to 100 pieces per square centimetres. Then both roughened stripes on the unprinted side of the tube are continuously covered with also 50 mm wide strips of spunbond non-woven, also displaced from each other by 160 mm's, the non-woven made of polypropylene not containing colouring masterbatches, having an average specific mass of 10 grams per square metre, a local specific mass of maximum 40 grams per square metre and an average fibre thickness of 6 microns, which strips are fixed to the roughened woven film tube with hot melt adhesive, using so little hot melt adhesive that does not substantially decrease the looseness of the structure of the non-woven material. The tube of woven film thus converted is rewound and later the reel of film is converted into 540 mm×780 mm size packing sacks with the conventional method which is cutting to size and sewing. Sacks are filled with 25 kilograms of animal feed each and closed, then laid in layers onto a pallet with their sides carrying non-woven strips looking down in such a way that there are five sacks in a layer on the pallet and the sacks being in contact with each other and belonging to layers above each other, together form, where it is possible, overlapping, brick-like, antislip bonds created by the adhesion arising between roughened surface parts and those covered with binding elements, which bonds can easily and reversibly be opened with lifting the sacks off each other vertically 55 filled sacks are placed on one pallet. The stack created this way can, unlike the ordinary sacks made of woven film, be moved with fort lift trucks or delivered with trucks even without a thick shrink film covering or stretch hood without the risk of collapsing caused by vibration.

What we claim is:

1. A process for preventing thermoplastic packaging films from slipping on each other characterized in that a system is formed which system comprises a binding element and films to be fixed at least one of the films to be fixed being rough, where such a roughed film is applied that has protrusions on its surface having suitable closeness and geometric features with respect to the binding element, and a binding element having a loose fibrous structure and individual fibre-stability is placed on one of the films at least on the entirety or part(s) of its parts to be bound with the roughed surface of the other film, which binding element comprises fibres of such closeness and layer thickness that between the fibres of the binding element and the protrusions of the roughed film a mechanical joint can be formed, and at least if a non-roughed film is applied as a part of said system a fixing is formed between the binding element and the surface part(s) of the film.

2. A process as claimed in claim 1 wherein the protrusions are constituted by particles.

3. A process as claimed in claim 2 wherein the particles are made of plastic.

4. A process as claimed in claim 1 wherein an inter-section between a plane of the film surface and the protrusions is such that the inter-section of the protrusions and the plane of the film surface does not cover a shape of projection of the protrusions viewed perpendicularly to the said plane of the film surface.

5. A process as claimed in claim 1 wherein the roughed films are applied on both surfaces of the binding element.

6. A process as claimed in claim 5 wherein the binding element is fixed to one of said two roughed films.

7. A process as claimed in claim 1 wherein said fixing between the binding element and the surface part(s) of the film is formed by sticking.

8. A process as claimed in claim 1 wherein said fixing between the binding element and the surface part(s) of the film is formed by welding.

9. A process as claimed in claim 1 wherein said fixing between the binding element and the surface part(s) of the film is formed by sewing.

10. A process as claimed in claim 1 wherein the thickness of the binding element is at most equal to a greatest height of the protrusions on the roughed surfaces of said films to be fixed.

11. A process as claimed in claim 1 wherein a binding element based on plastic having well ordered or disordered or reticular fibrous structure is applied.

12. A process as claimed in claim 1 wherein a binding element based on plastic non-woven fabric is applied.

* * * * *

UNITED STATES PATENT AND TRADEMARK OFFICE
CERTIFICATE OF CORRECTION

PATENT NO.     : 6,444,080 B1
DATED          : September 3, 2002
INVENTOR(S)    : Mandzsu, Sr.

It is certified that error appears in the above-identified patent and that said Letters Patent is hereby corrected as shown below:

<u>Column 9,</u>
Line 19, after the word "fixed" insert -- , --.

Signed and Sealed this

Twenty-fifth Day of February, 2003

JAMES E. ROGAN
*Director of the United States Patent and Trademark Office*